US012768786B2

(12) United States Patent
Schonle et al.

(10) Patent No.: US 12,768,786 B2
(45) Date of Patent: Oct. 20, 2026

(54) METHODS AND DEVICE FOR DETECTING SINGLE PHOTONS FROM A SAMPLE COMPRISING AT LEAST ONE EMITTER

(71) Applicant: ABBERIOR INSTRUMENTS GMBH, Gottingen (DE)

(72) Inventors: Andreas Schonle, Gottingen (DE); Noel Moliere, Stadthagen (DE)

(73) Assignee: ABBERIOR INSTRUMENTS GMBH, Gottingen (DE)

( * ) Notice: Subject to any disclaimer, the term of this patent is extended or adjusted under 35 U.S.C. 154(b) by 203 days.

(21) Appl. No.: 18/650,459

(22) Filed: Apr. 30, 2024

(65) Prior Publication Data

US 2024/0280488 A1 Aug. 22, 2024

Related U.S. Application Data

(63) Continuation-in-part of application No. PCT/EP2022/081222, filed on Nov. 9, 2022.

(30) Foreign Application Priority Data

Nov. 10, 2021 (EP) .................................... 21207620
May 3, 2023 (EP) .................................... 23171420

(51) Int. Cl.
*G01N 21/64* (2006.01)

(52) U.S. Cl.
CPC ..... *G01N 21/6428* (2013.01); *G01N 21/6402* (2013.01); *G01N 21/6408* (2013.01)

(58) Field of Classification Search
None
See application file for complete search history.

(56) References Cited

U.S. PATENT DOCUMENTS 10,753,872 B2 8/2020 Lee et al.
2005/0230610 A1 10/2005 Schreiber
2017/0303789 A1 10/2017 Tichauer et al.

FOREIGN PATENT DOCUMENTS

DE 10 2004 017 956 A1 11/2005
EP 3431967 A1 1/2019

OTHER PUBLICATIONS

Lieske (Lieske, T., Uhring, W., Dumas, N. et al. Embedded Fluorescence Lifetime Determination for High-Throughput, Low-Photon-Number Applications. J Sign Process Syst 91, 819-831 (2019). https://doi.org/10.1007/s11265-018-1372-9). (Year: 2019).*

(Continued)

*Primary Examiner* — David J Makiya
*Assistant Examiner* — Miya Downing
(74) *Attorney, Agent, or Firm* — MOSER TABOADA

(57) ABSTRACT

The present disclosure relates to methods and devices (1) for detecting single photons from a sample comprising at least one emitter, wherein light pulses are generated by a light source (10) to trigger the at least one emitter to emit photons, and wherein the emitted photons are detected by an acquisition system (20) comprising a detector (21), wherein a repetition rate of the light pulses or a dead time of the acquisition system is adjusted, or wherein an input comprising a desired value of the repetition rate or the dead time is received via a user interface (32), wherein a photon confidence level is determined based on the received input, and wherein an output representing said photon confidence level or indicating whether the photon confidence level is outside of a pre-determined range or a record of said photon confidence level is generated.

16 Claims, 3 Drawing Sheets

(56) References Cited

OTHER PUBLICATIONS

International Search Report for PCT/EP2022/081222 dated Feb. 2, 2023.
Lieske Tobias et al., Embedded Fluorescence Lifetime Determination for High-Throughput, Low-Photon-Number Applications, Journal of Signal Processing Systems, May 9, 2018, pp. 819-831, vol. 91, No. 7.
Matthias Patting et al., Dead-time effects in TCSPC data analysis, Proceeding of Spie, May 4, 2007, pp. 658307-1, vol. 6583.
Lior Turgeman et al., Photon Efficiency Optimization in Time-Correlated Single Photon Counting Technique for Fluorescence Lifetime Imaging Systems, IEEE Transaction on Biomedical Engineering, Jun. 1, 2013, vol. 30, No. 6, pp. 1571-1579.
Peronio P et al., Improving the counting efficiency in time-correlated single photon counting experiments by dead-time optimization, Review of Scientific Instruments, Nov. 3, 2015, vol. 86, No. 11, pp. 113101-1-113101-8.
Becker, W., The bh TCSPC Handbook, 10th Edition, 2023, 5 pages, downloaded from https://www.becker-hickl.com/literature/documents/flim/the-bh-tcspc-handbook/.
Marco Castello et al., A robust and versatile platform for image scanning microscopy enabling super-resolution FLIM, Nature Methods, Brief Communication, Jun. 2, 2018, 21 pages, https://doi.org/10.1038/s41592-018-0291-9.
M Stipcevic et al., An advanced active quenching circuit for ultra-fast quantum cryptography, Opt. Express 25, 2017, pp. 21861-21876, DOI: 101364/OE.25.021861).
Ching-Wei Lin et al., Synchro-Excited Free-Running Single Photon Counting: A Novel Method for Measuring Short-Wave Infrared Emission Kinetics, Anal Chem. 91(19), Oct. 1, 2019, pp. 12484-12491.
W. Becker, “The bh TCSPC handbook 8th edition” bh, Sep. 2019, Part 1, 100 pages, www.becker-hickl.com.
W. Becker, “The bh TCSPC handbook 8th edition” bh, Sep. 2019, Part 2, 100 pages, www.becker-hickl.com.
W. Becker, “The bh TCSPC handbook 8th edition” bh, Sep. 2019, Part 3, 100 pages, www.becker-hickl.com.
W. Becker, “The bh TCSPC handbook 8th edition” bh, Sep. 2019, Part 4, 100 pages, www.becker-hickl.com.
W. Becker, “The bh TCSPC handbook 8th edition” bh, Sep. 2019, Part 5, 100 pages, www.becker-hickl.com.
W. Becker, “The bh TCSPC handbook 8th edition” bh, Sep. 2019, Part 6, 100 pages, www.becker-hickl.com.
W. Becker, “The bh TCSPC handbook 8th edition” bh, Sep. 2019, Part 7, 100 pages, www.becker-hickl.com.
W. Becker, “The bh TCSPC handbook 8th edition” bh, Sep. 2019, Part 8, 100 pages, www.becker-hickl.com.
W. Becker, “The bh TCSPC handbook 8th edition” bh, Sep. 2019, Part 9, 100 pages, www.becker-hickl.com.
W. Becker, “The bh TCSPC handbook 8th edition” bh, Sep. 2019, Part 10, 68 pages, www.becker-hickl.com.

* cited by examiner

METHODS AND DEVICE FOR DETECTING SINGLE PHOTONS FROM A SAMPLE COMPRISING AT LEAST ONE EMITTER

CROSS-REFERENCE TO RELATED APPLICATIONS

The present application is a continuation-in-part application and claims priority to and the benefit of International Patent Application No. PCT/EP2022/081222, filed on Nov. 9, 2022, which claims priority to EP patent Application No. 21207620.2 filed on Nov. 10, 2021 and EP patent application Ser. No. 23/171,420.5 filed on May 3, 2023. Each of these applications is incorporated herein by reference in their entirety.

TECHNICAL AREA

The present disclosure relates to methods for detecting single photons from a sample comprising at least one emitter (e.g., a fluorophore), a device for implementing the methods and a non-transitory computer readable medium comprising instructions configured to execute one of the methods when the instructions are executed on a computer.

PRIOR ART

Single photon counting is advantageous for various applications, for example in high resolution light microscopy and optical spectroscopy.

For instance, many confocal fluorescence light microscopes use detectors featuring a counting mode, in which they accumulate the emission signal by counting individual photons.

Furthermore, when using detectors that not only count photons, but also monitor and record arrival times of individual photons (e.g., by a method termed time-correlated single photon counting, TCSPC), lifetimes of emitters can be determined. In lifetime imaging, this additional information can be used to generate a color-coded image of the sample, where the color code reflects the lifetime values which depend on the local environment of the emitters in the sample. Furthermore, multiple fluorophores may be distinguished in a microscopic image by their lifetimes even if their absorption and/or emission spectra overlap.

Specialized detector modules for time-correlated single photon counting (TCSPC) are known from the prior art. These contain photon detectors based on, e.g., photomultiplier tubes, avalanche photodiodes or hybrid detectors based on a combination of photomultipliers and avalanche photodiodes. Additionally, most TCSPC modules comprise electronic circuits coupled to the photon detector which can be used to count the incoming photons and determine the arrival times of the individual photons at the detector.

An overview of TCSPC and detector technology can be found, e.g., in the document "The bh TCSPC Handbook", $8^{th}$ Edition, September 2019, by Wolfgang Becker (https://www.becker-hickl.com/literature/documents/flim/the-bh-tcspc-handbook/).

In case of emittance lifetime measurements, the output of the counting electronics is usually a histogram of the arrival times of the photons, the shape of which resembles a time-course of emittance decay with a corresponding time constant yielding the emittance lifetime of interest.

An example of a fluorescence lifetime imaging (FLIM) method applied in a high-resolution light microscope depending on single photon counting is described in the publication by Marco Castello et al., "A robust and versatile platform for image scanning microscopy enabling super-resolution FLIM", Nature Methods, Brief Communication, https://doi.org/10.1038/s41592-018-0291-9, published online on Jan. 14, 2019. According to the method described in this publication, excitation light capable of exciting fluorophores is focused into an area of the sample which is then imaged onto an array of single photon avalanche photodiodes (SPAD) arranged in a confocal plane. Using the signal of the photodiodes, the arrival times of individual photons at the detector are determined by single photon counting electronics and fluorescence lifetimes of the fluorophores are determined from histograms of the arrival times.

Patent application US 2017/0303789 A1 describes a medical imaging device and a corresponding method based on optical projection tomography. A millimeter-thick biological sample is transilluminated by laser pulses to excite fluorescent molecules in the sample. Single photons generated by fluorescence emission are detected using SPADs coupled to TCSPC modules. The repetition rate of the laser source is adjusted dependent on the dead time of the SPADs to selectively detect early photons which have a lower probability of scattering on the biological tissue, and therefore yield more reliable tomography data even at very high light intensities of the excitation laser.

Patent application DE 10 2004 017 956 A1 describes a light microscope for examining emittance lifetimes of emitters in a sample comprising a light source based on a semiconductor laser emitting pulsed excitation light and a control device configured to adapt the repetition rate of the laser pulses to the lifetime of the emitters. This is used to avoid excitation pulses occurring at a time, at which the emitters are still in their excited state, which might lead to wrong measuring results. The described method aims at measuring fluorophores of arbitrary excitation spectra in a time-efficient manner. The adjustment of the repetition rate occurs in a sample specific manner. However, no specifics of how the repetition rate can be automatically set to advantageous values are disclosed. Furthermore, the disclosure is silent regarding how the repetition rate can be adapted to certain types of photon detectors.

Certain detectors and electronic circuits used in TCSPC have relatively long dead times which may be more than one order of magnitude larger than typical emittance lifetimes of emitters. In addition to the well-known pile-up effect (also termed "early photon bias") which stems from the fact that only the first photon following a light pulse is detected, while later photons may hit the detector during its dead time, additional complex saturation effects occur dependent on the dead times of detectors, detection electronics and the number of detected photons per time interval.

If the period between two subsequent laser pulses is shorter than the dead time of the detector, it is evident that the second pulse falls into the dead time of the detector if a photon is detected following the first pulse. Thus, it will be insensitive for at least a certain fraction of the time interval after the pulse during which fluorescence photons are expected.

However, this may also occur when the pulse-to-pulse time interval is longer than the detector dead time, as fluorescence photons can arrive a significant time after the light pulse that has generated them.

In such situations the detector may become active shortly after a light pulse, which introduces timing artefacts and corresponding distortions in the detection histogram during lifetime measurements.

For example, an effect termed 'twilighting' has been described for SPAD detectors: During a certain time at the end of the detector dead time, the detector is sensitive to incoming photons, but the electronics coupled to the detector remains inactive until the end of the dead time (see, e.g., M Stipcevic, B G Christensen, P G Kwiat, D J Gauthier: 'An advanced active quenching circuit for ultra-fast quantum cryptography', Opt. Express 25, 21861-21876 (2017), DOI: 101364/OE.25.021861). This leads to an erroneous recording of arrival times for photons that have hit the detector during the twilighting period.

Importantly not only the overall length of the pulse-to-pulse time interval but also the distribution of the time difference between a pulse and the detection time of a photon strongly influences the described saturation artefacts.

In contrast to the pile-up effect, which can be corrected relatively easily, correction of the described type of saturation artefacts is complex or impossible. Thus, even though it may be possible to correct these effects computationally in some cases, this is prone to errors, leads to additional use of computational resources and reduces the signal-to-noise ratio.

In the publication 'Synchro-Excited Free-Running Single Photon Counting: A Novel Method for Measuring Short-Wave Infrared Emission Kinetics' by Ching-Wei Lin et al., Anal Chem. 91(19):12484-12491, Oct. 1, 2019, a method for time-resolved measurements of short-wave infrared photoluminescence is described, in which the excitation pulses are feedback-controlled by the detector signal with a pre-set delay between photon detection and the corresponding excitation pulse to avoid occurrence of photons in the detector dead time.

Although sufficient to reduce artefacts, such aperiodic triggering results in variations in the pulse energies of many pulsed laser systems. This problem is exacerbated when several synchronized lasers are used, such as in STED microscopy. In addition, the applicability of the method is limited by the speed of the electronics used to implement the feedback control.

Objective Problem

Hence, the problem underlying the present disclosure is to provide a method for detecting single photons from a sample comprising at least one emitter, the photons being induced by periodic light pulses, and a corresponding device and computer program for implementing the method, which are improved with respect to of the above-discussed shortcomings of the prior art, in particular, a method, a device and a computer program which reduce the occurrence of artefacts during single photon detection in addition to the pile-up effect.

Solution

This objective is attained by the claims.

For example, claim 1 provides a method whereby the repetition rate of the light pulses from a light source or the dead time of an acquisition system is adjusted, such that certain artefacts due to the detector dead time are mitigated .

Embodiments are specified in sub claims and are described hereafter.

DESCRIPTION

A first aspect of the present disclosure relates to methods for detecting single photons from a sample comprising at least one emitter, particularly for microscopic imaging of the sample or localization of the at least one emitter, wherein light pulses separated by a pulse period are generated by a light source to trigger the at least one emitter to emit photons, and wherein the emitted photons are detected by an acquisition system comprising a detector, wherein the acquisition system comprises an active state, in which the acquisition system is able to detect and correctly record photons, an inactive state in which the acquisition system is unable to detect photons and optionally a twilighting state in which the acquisition system is able to detect photons but unable to correctly record the photons.

In a method according to a first alternative of the first aspect, a repetition rate of the light pulses is adjusted dependent on a dead time of the acquisition system and an expected emittance lifetime of the at least one emitter, wherein the acquisition system remains in the inactive state or the twilighting state for the length of the dead time after each detection of a photon.

In particular, the repetition rate is adjusted dependent on the dead time of the acquisition system, the expected emission lifetime of the at least one emitter and a number of incident photons on the detector per light pulse.

In a method according to a second alternative of the first aspect, a dead time of the acquisition system is adjusted dependent on a repetition rate of the light pulses and an expected emittance lifetime of the at least one emitter, wherein the acquisition system remains in the inactive state or the twilighting state for the length of the dead time after each detection of a photon.

The method according to the second alternative of the first aspect can be used, for example, to adapt an acquisition system to different types of lasers with different repetition rates, in order to minimize artifacts as explained herein.

In particular, the dead time is adjusted dependent on the repetition rate of the light pulses, the expected emission lifetime of the at least one emitter and a number of incident photons on the detector per light pulse.

In the context of the present specification, the term 'light pulse' is defined as a non-continuous electromagnetic wave or wave packet having a duration (pulse width) in time, the wavelength being in the visible range, infrared range or ultraviolet range of the spectrum. In particular, the light source generating the light pulses is a pulsed laser source.

The term 'emitter', as used herein, describes a molecule, molecular complex or particle emitting electromagnetic radiation, particularly in the visible range, infrared range or ultraviolet range, when triggered by external light. For example, the emitter may be a fluorophore or may be coupled (i.e., covalently or non-covalently bound) to a fluorophore which emits fluorescent light when excited by a light pulse of appropriate wavelengths. Alternatively, e.g., the emitter may be a quantum dot. Besides fluorescence, other mechanisms of triggering the at least one emitter to emit a photon are also envisioned within the scope of the present disclosure. For instance, emitted photons may be a consequence of light scattering. Yet another example is photo-activation, which may comprise transferring the at least one emitter from a first, e.g., non-fluorescent or dark state, to a second, light-emitting, state, e.g., wherein the at least one emitter emits fluorescence in response to excitation light in the second state. In this case, the excitation light exciting the at least one emitter in the second state may stem from the light pulses which also activate the at least one emitter, or the excitation light may be provided from another source, wherein, in particular, the excitation light may have another wavelength than the activation light.

The repetition rate is defined herein as the inverse of the period between two consecutive light pulses. The repetition rate may be constant or variable in time but is typically kept constant during an experiment, even after an optional adjustment according to the first alternative of the first aspect. The inverse of the repetition rate is termed 'pulse-to-pulse time interval' or 'pulse period' throughout the present specification.

An 'acquisition system' within the meaning used throughout this specification is a system comprising at least one detector configured to detect single photons. Such detectors generate a signal (typically an electric signal) in response to a photon hitting the detector. For example, suitable detectors include photomultiplier tubes, avalanche photodiodes (APDs or SPADs), hybrid detectors and arrays of the afore mentioned detector types. In particular, the acquisition system further comprises an evaluation device, e.g., evaluation electronics, configured to evaluate and/or process a signal provided by the detector in response to a photon hitting the detector. Such processing may, e.g., involve determining and recording the exact absolute arrival time of the event and/or the arrival time relative to the times at which light pulses are generated.

'Detecting' photons by the acquisition system means detection of the photons by the at least one detector of the acquisition system. In contrast, the term 'recording' photons describes any downstream processing or evaluation steps performed after detection, e.g., by the evaluation device of the acquisition system. In the active state, the detector is able to detect photons and the evaluation device is able to correctly record the photon detection. Conversely, in the inactive state the detector is unable to detect photons and/or the evaluation device is unable to record photon detections. For instance, in case of APDs, the inactive state will typically include the time of the avalanche current as well the time during which passive and/or active quenching takes place, and hence the detector is insensitive to further photons.

In the optional twilighting state (which has been described, in particular, for APDs), the detector is at least partially sensitive to further incoming photons (e.g., in case of APDs during the rise time of the operating voltage after completion of active quenching, at which time a further photon may initiate another avalanche current), but the evaluation device is still de-activated. Thus, if a further photon causes an avalanche current and the evaluation device reactivates shortly thereafter, the photon will be recorded at an incorrect apparent arrival time, namely the time of reactivation of the electronics.

Within the context of the present specification, the 'dead time' of the acquisition system designates a time interval during which the acquisition system is in the inactive state or (if such a state exists in the respective acquisition system) in the twilighting state. In case a twilighting state exists, it typically occurs during a twilighting time period at the end of the dead time. Thus, if a twilighting state exists, the twilighting time period is included in the dead time according to the definition used throughout this specification. In particular, the dead time is not to be confused with a dead time or holdoff time of the detection electronics receiving the detector pulse signal which can be used to reduce the effect of after-pulsing on the detected photon counts as the latter has no influence on the detector state and is just an electronic filter. The detector dead time on the other hand directly influences the duration of and whether or not the detector enters its different states when a photon is incident and can be adjusted e.g. by changing the parameters of the active quenching circuit in APDs or APD modules.

In certain embodiments, the acquisition system comprises a dead time in a range from 10 ns to 100 ns, particularly 20 to 40 ns. APDs typically have longer dead times than, for instance, photomultiplier tubes.

The 'emittance lifetime' of an emitter is defined herein as a parameter expressing the typical (or average) time after which a photon is emitted after a light pulse. In case of fluorescence emission by the emitters in response to excitation light, the emittance lifetime is the fluorescence lifetime. E.g., in case light emission can be described as a single exponential process, the emittance lifetime is particularly defined as the inverse of the time constant of a single exponential decay. For an ensemble of emitters, this emittance lifetime describes the time after which the light intensity from light emission has dropped to a fraction of 1/e of the initial intensity value. In case of an individual emitter, emission of a photon after triggering by the light pulse follows a probability distribution which can be described, e.g., by a single exponential decay, and the emittance lifetime is the time after which the probability that a given emitter has emitted a photon is equal to 1-1/e.

In the context of the present specification, the term 'expected emittance lifetime' describes a predetermined emission lifetime of a given emitter under certain (standard) conditions. This parameter can be obtained by independent measurements. In contrast, the term 'measured emittance lifetime' describes an emittance lifetime determined by photon detection. Depending on the sample composition, this value may (e.g., locally) deviate from the expected emittance lifetime (e.g., in case of fluorescence due to temperature and pH of the sample and due to interactions with other molecules in the sample).

The number of incident photons per light pulse may be determined in different ways, particularly depending on the kind of measurement. For instance, the number of incident photons per light pulse may be an expected number of incident photons or a measured number of incident photons.

In certain embodiments, the number of incident photons per light pulse may be a maximum number of incident photons obtained in a pre-defined time period, a maximum number of incident photons over an entire area of the sample (e.g., all pixels of a microscopic image or localization map) or part of such an area, e.g., a region of interest of the sample depending on the application.

In this manner, e.g., the repetition rate or the dead time can be adjusted specifically to areas of the sample where photon arrival time determination with high precision is required, e.g., regions of interest from which emittance lifetime information is determined.

In other implementations, the number of incident photons per light pulse may be an average number of incident photons, particularly a temporal average (e.g., determined in a pre-defined time interval) or a spatial average (e.g., determined over an area of the sample, such as an imaged area or a localization map or a part of such as area, e.g., a region of interest of the sample).

In yet other implementations, the number of incident photons per light pulse may be defined as a threshold number which is exceeded only by a certain absolute number of pixels or percentage of pixels in a sample area or region of interest.

According to the present specification, the repetition rate of the light pulses is adjusted, particularly automatically adjusted, dependent on the dead time of the acquisition system, the expected emittance lifetime of the at least one emitter and optionally the number of incident photons per light pulse, or the dead time of the acquisition system is adjusted, particularly automatically adjusted, dependent on the repetition rate of the light pulses, the expected emittance lifetime of the at least one emitter and optionally the number of incident photons per light pulse. As will be explained in more detail throughout this specification, the probability that artefacts in addition to the pile-up effect occur in the measured distribution of photon arrival times depends in a non-intuitive way on the dead time of the acquisition system, the emittance lifetime, and the number of incident photons per light pulse (which in turn depends on the count rate and the repetition rate). In other words, the range of repetition rates resulting in an acceptable photon arrival time distribution depends on the detector dead time, the emittance lifetime and the count rate in a complex manner, and the range of dead times resulting in an acceptable photon arrival time distribution depends on the repetition rate, the emittance lifetime and the count rate in a complex manner.

In particular, establishing conditions under which the state of the acquisition system is either fully active or fully inactive with a high certainty for times at which photons are expected to hit the detector is of great advantage for avoiding artefacts in the photon distribution. By the methods according to the present disclosure, such artefacts occurring in addition to the well-known pile-up effect can be mitigated and even completely avoided. This improves the accuracy of estimates for the actual incident photon rates and particularly allows more accurate estimates of the emittance lifetime by computationally correcting for the remaining pile-up effect.

In certain embodiments, the repetition rate or the dead time is adjusted such that for each light pulse triggering a photon emission, the acquisition system is in the active state with a certain confidence level, particularly the photon confidence level as defined herein, when emitted photons arrive at the detector. Thus, a given actual photon count rate can be achieved by a minimum number of light pulses, which, e.g., minimizes the danger of photobleaching and phototoxicity. In particular, a desired value of the confidence level is received via a user interface. In particular, the certain confidence level represents a probability of 0.9 or more, particularly 0.95 or more, more particularly 0.99 or more.

In other embodiments, particularly if the dead time of the detector is much longer, or is adjusted to a value that is much longer, than the emittance lifetime of the emitters, the repetition rate or the dead time may be adjusted such that for each light pulse triggering a photon emission the acquisition system is either in the active state or in the inactive state (but not in an undefined state) with a certain confidence level, particularly the photon confidence level as defined herein, when emitted photons arrive at the detector. In particular, a desired value of the confidence level is received via a user interface. In particular, the certain confidence level represents a probability of 0.9 or more, particularly 0.95 or more, more particularly 0.99 or more.

In certain embodiments, the repetition rate or the dead time is adjusted such that arrival of incident photons on the detector after switching of the acquisition system from the inactive state to the active state or from the inactive state to the twilighting state but before the next light pulse can be excluded with a certain confidence level, particularly the photon confidence level as defined herein. In particular, a desired value of the certain confidence level is received via a user interface. In particular, the certain confidence level represents a probability of 0.9 or more, particularly 0.95 or more, more particularly 0.99 or more.

In case the detector of the acquisition system exhibits twilighting, as described in particular for APDs, a photon occurring during the twilighting time period of the detector will be sensed by the detector. However, since the evaluation device is inactive in the twilighting state, this photon will be wrongly recorded at the time at which the evaluation device re-activates, i.e., at the end of the dead time. This leads to erroneous arrival time data, and particularly to distorted photon histograms, in case of time-correlated single photon counting. Thus, the above-stated embodiment improves the accuracy of photon arrival time data.

In certain embodiments, the repetition rate is adjusted to a value in a range from 10 MHz to 150 MHz.

In certain embodiments, the dead time is adjusted to a value in a range from 1 ns to 100 ns. In certain embodiments, the repetition rate of the light pulses (or the pulse period) is adjusted according to a function of the dead time of the acquisition system and the expected emittance lifetime of the at least one emitter. In certain embodiments, the dead time is adjusted according to a function of the repetition rate (or the pulse period which is the inverse of the repetition rate) of the light pulses and the expected emittance lifetime of the at least one emitter. In contrast to empirical rules which have been used to adjust the repetition rate according to methods of the prior art, the functional relationships established herein allow an optimal adaptation of the repetition rate or the dead time to the experimental conditions. In particular, the repetition rate is adjusted according to a function of the dead time of the acquisition system, the expected emittance lifetime of the at least one emitter, and the (expected or measured) number of incident photons on the detector per light pulse. In particular, the dead time is adjusted according to a function of the repetition rate (or pulse period) of the light pulses, the expected emittance lifetime of the at least one emitter, and the (expected or measured) number of incident photons on the detector per light pulse.

In certain embodiments, the pulse period is adjusted according to a monotonically increasing function of the dead time of the acquisition system and the expected emittance lifetime of the at least one emitter.

In certain embodiments, the dead time of the acquisition system is adjusted according to a monotonically increasing function of the pulse period of the light pulses and/or according to a monotonically decreasing function of the expected emittance lifetime of the at least one emitter.

In certain embodiments, the pulse period is set to a value of $t_p=\tau_d+a\cdot\tau_L$, wherein $\tau_d$ indicates the dead time of the acquisition system, a is a scaling parameter which is a positive real number equal to or greater than 1 and $\tau_L$ indicates the expected emittance lifetime of the at least one emitter.

In certain embodiments, the dead time is set to a value of $\tau_d=\tau_P-a\cdot\tau_L$, wherein $\tau_d$ indicates the dead time of the acquisition system, $t_p$ is the pulse period of the light pulses, a is a scaling parameter which is a positive real number equal to or greater than 1 and $\tau_L$ indicates the expected emittance lifetime of the at least one emitter.

In certain embodiments, a photon confidence level is provided, wherein the photon confidence level is a measure for a probability that if one or more photon emissions are triggered by a respective light pulse, no photon emission was triggered after a maximum emittance time after the light pulse previous to the respective light pulse, wherein the repetition rate or the dead time is adjusted based on the photon confidence level and/or the maximum emittance time. In particular, the repetition rate is adjusted (optionally in addition to adjusting the dead time) such that the pulse period is equal to or greater than the maximum emittance time, particularly equal to or greater than twice the maximum emittance time.

The probability of events resulting in artefacts in the measured photon arrival time of a photon occurring after a certain light pulse critically depends on the photon emissions triggered by the previous light pulse, since the photons triggered by the previous light pulse and detected by the detector determines the start of the detector dead time and thus the state of the detector at the time of the next pulse. By determining the maximum emittance time for a given (e.g., pre-defined) photon confidence level, the repetition rate or the dead time can thus be adjusted to exclude artefacts at the given photon confidence level.

The 'maximum emittance time' is the time after a light pulse after which photon emissions have occurred with a certain pre-defined probability. Since photon emission is a stochastic process, photons may occur even at times after the 'maximum emittance time'. Therefore, the term 'maximum emittance lifetime' is not to be understood as an absolute upper boundary (which does not actually exist) of the time between excitation and emission.

The maximum emittance time depends on the emittance lifetime, wherein longer emittance lifetimes result in a greater maximum emittance time.

In certain embodiments, the maximum emittance time is determined based on the expected emission lifetime and the number of incident photons per light pulse. A greater number of incident photons per light pulse (e.g., a greater count rate at constant repetition rate) may increase the probability of multiple photon emissions triggered by a light pulse and may thus increase the maximum emission time.

In certain embodiments, the repetition rate or the dead time is adjusted, such that the photon confidence level is set to or approaches a pre-set value. In certain embodiments, the pre-set value of the photon confidence level is received via a user interface (e.g., comprising a keyboard, touchscreen or similar device), wherein particularly the repetition rate is adjusted dependent on the dead time of the acquisition system, the expected emittance lifetime of the at least one emitter, the received input and particularly the number of incident photons per light pulse, or the dead time is adjusted dependent on the repetition rate, the expected emittance lifetime of the at least one emitter, the received input and particularly the number of incident photons per light pulse.

In certain embodiments, the maximum emittance lifetime is equal to a product of the expected emittance lifetime and the above-mentioned scaling parameter.

The measure for the above-defined probability and/or the photon confidence level received via the user interface may have various forms: For instance, the measure may be a number, e.g., a real number between 0 and 1 or a percentage between 0% and 100%, wherein values of 1 or 100% indicate certainty of the above-defined event, wherein particularly the number is the actual probability. The dependency between the actual probability and the measure may be linear or non-linear. Alternatively, the input representing the photon confidence level may comprise values of an arbitrary scale (e.g., from 1 to 5, 1 to 5 indicating increasing levels of confidence) or a category (e.g., 'low', 'medium', 'high', 'very high'). Such categories may also be expressed by symbols, colors or other graphical representations. The user may be able to select the input from at least two discrete values or from a continuous range of value. The input may be received in various forms, e.g., by entering a number on a keyboard, by moving a slider by a touchscreen interaction or a computer mouse 'drag'-operation, by clicking or touching a button or activating a checkbox on a computer screen, activating a physical switch, voice input etc.

In particular, as an alternative to receiving a user input to select the photon confidence level, the photon confidence level can also be automatically set to a desired value, e.g., a fixed value or a value which is dependent on further system parameters or experimental parameters.

In certain embodiments, the maximum emittance time is determined by the equation $\tau_{max}=-\tau_L \ln(-\ln(c_p)/E)$, wherein $\tau_L$ indicates the expected emittance lifetime, ln indicates the natural logarithm, $c_p$ indicates the photon confidence level and E indicates the number of incident photons per pulse.

This equation assumes a mono-exponential decay of the emittance, i.e., a probability distribution of single photon emissions given by $$P(t) = \exp(-t/\tau_L), \quad (1)$$

wherein P(t) indicates the probability for a single photon emission at the time t after a respective light pulse, and $\tau_L$ indicates the expected emittance lifetime.

Under these conditions, each individual emitted photon occurs within time $\tau_{max}$ after the respective light pulse with probability P*, wherein P* is given by $$P^* = 1 - \exp(-\tau_{max}/\tau_L) \quad (2)$$

The probability P(n) that n photon emissions are triggered by a given light pulse can be described by the Poissonian distribution $$P(n) = \exp(-E)E^n/n!, \quad (3)$$

wherein E indicates the number of incident photons per light pulse.

Furthermore, given n photon emissions, the probability that none of those photon emissions occur after time $\tau_{max}$ after the respective light pulse equal $[1-\exp(-\tau_{max}/\tau_L)]^n$.

The photon confidence level $c_p$ can be determined by the sum over all n of the combined probabilities that n photons are emitted and in each case none of those photons occur after time $\tau_{max}$:

$$c_p = \sum_{n=0}^{\infty} \exp(-E)/n!\ E_n\left[1 - \exp(-\tau_{max}/\tau_L)\right]^n \quad (4)$$

Equation (4) can be simplified as follows:

$$c_p = \exp(-E\exp(-\tau_{max}/\tau_L)) \quad (5)$$

Solving equation (5) for $\tau_{max}$ yields the above-stated expression.

Note that the above-stated derivation of $c_p$ can be generalized for emittance decays which are not mono-exponential (e.g., multi-exponential decays). In this case, the term $1-\exp(-\tau_{max}/\tau_L)$ can be substituted for the corresponding probability P* that each emitted photon occurs within time $\tau_{max}$ after the respective light pulse. Thereby, a "generalized" photon confidence level of $$c_p = \exp(-E(1-P^*)) \quad (6)$$

may be obtained. In particular, from this expression and the corresponding probability distribution, $\tau_{max}$ can be calculated for other than mono-exponential decays and used in the adjustment of the repetition rate or the dead time.

Of course, as an alternative to the simplifications according to equations (5) and (6) the photon confidence level may also be determined by numerical calculation of the sum according to equation (4) or the corresponding generalized sum, where P* is used instead of the expression derived from the mono-exponential decay.

In certain embodiments, the pulse period is adjusted to $\tau_{max}+\tau_d$ or more, wherein $\tau_{max}$ designates the maximum emittance time of the at least one emitter and to indicates the dead time of the acquisition system. In certain embodiments, the dead time is adjusted to $t_p-\tau_{max}$ or more, wherein $\tau_{max}$ designates the maximum emittance time of the at least one emitter and $t_p$ indicates the pulse period of the light pulses. In this manner, it is ensured (at the given photon confidence level) that even if a photon occurs at the end of the maximum emittance lifetime after the respective light pulse, the dead time of the acquisition system will have passed at the time of the next light pulse, such that the acquisition system will be in the active state at the next pulse. The repetition rate can be set to a lower value to achieve the same effect. However, setting the repetition rate as high as possible will be desirable in many cases to increase the detected emission signal.

In certain embodiments, the repetition rate or the dead time of the acquisition system is adjusted to different values during a measurement such that the photon confidence level is in a pre-defined range, particularly above a threshold value, at all times during the measurement (that is, e.g., for all pixels in an image or localization map and/or for all time points in a time series and/or for all images or localization maps in a time series).

For example, this may be achieved by monitoring the number of incident photons per pulse (from a measured count rate and the current repetition rate) and optionally discarding data that has been acquired before the repetition rate or the dead time was adjusted or by performing a pre-measurement predicting the number of incident photons per pulse, or in a time series by predicting the number of incident photons per pulse from the knowledge of the structure of the image and/or from an overall decrease or increase in brightness.

In certain embodiments, given that the dead time of the acquisition system is equal to or greater than the maximum emittance time, the repetition rate is adjusted such that at least one of the light pulses occurs within the dead time after the previous light pulse, and such that the pulse period equals at least twice the maximum emittance time ($2\tau_{max}$), or, in case the acquisition system remains in a twilighting state for a twilighting time period at the end of the dead time after each detected photon, such that the pulse period equals at least twice the maximum emittance time plus the twilighting time period ($2\tau_{max}+\tau_{twilight}$).

In certain embodiments, the dead time of the acquisition system is adjusted to a value equal to or greater than the maximum emittance time, and the dead time is adjusted such that at least one of the light pulses occurs within the dead time after the previous light pulse, wherein the pulse period equals at least twice the maximum emittance time ($2\tau_{max}$), or, in case the acquisition system remains in a twilighting state for a twilighting time period at the end of the dead time after each detected photon, wherein the pulse period equals at least twice the maximum emittance time plus the twilighting time period ($2\tau_{max}+\tau_{twilight}$).

In certain embodiments, the repetition rate is adjusted to a value of $M/(\tau_{max}+\tau_d)$, wherein M is a natural number above 1, $\tau_{max}$ is the maximum emittance time and $\tau_d$ is the dead time of the acquisition system.

In other words, according to this embodiment, the repetition rate is adjusted to an integer multiple of $$\frac{1}{\tau_{max}+\tau_d}.$$

As described above, a repetition rate equal to $$\frac{1}{\tau_{max}+\tau_d}$$

results in an active acquisition system at each light pulse with the pre-determined photon confidence level. Setting the repetition rate to an integer multiple of this value generates a number of intermediate light pulses in the time interval [0, $\tau_{max}+\tau_d$], e.g., one intermediate pulse for M=2 or two intermediate pulses for M=3. If a photon was generated by an initial pulse at the start of this interval, some or all of these immediate pulses may occur within the dead time, and therefore photons generated by these pulses might not be detected and recorded by the acquisition system. This is acceptable, however, if it is ensured at the photon confidence level that photons generated by the intermediate pulses do not occur in a time interval, in which switching of the acquisition system from the inactive state to the active state or from the twilighting state to the active state may take place.

In certain embodiments, the dead time is adjusted to a value of $M\cdot t_p-\tau_{max}$, wherein M is a natural number above 1, $\tau_{max}$ is the maximum emittance time and $t_p$ is the pulse period of the light pulses.

As described above, a dead time equal to $t_p-\tau_{max}$ results in an active acquisition system at each light pulse with the pre-determined photon confidence level. Setting the dead time to a value of $M\cdot t_p-T_{max}$ generates a number of intermediate light pulses in the time interval [0, $\tau_{max}+\tau_d$], e.g., one intermediate pulse for M=2 or two intermediate pulses for M=3. If a photon was generated by an initial pulse at the start of this interval, some or all of these immediate pulses may occur within the dead time, and therefore photons generated by these pulses might not be detected and recorded by the acquisition system. This is acceptable, however, if it is ensured at the photon confidence level that photons generated by the intermediate pulses do not occur in a time interval, in which switching of the acquisition system from the inactive state to the active state or from the twilighting state to the active state may take place.

In particular, for detectors without a twilighting state, switching from the inactive state to the active state occurs in a 'switching interval' following the dead time after detection of a photon. At the pre-determined photon confidence level, photons will be detected in the interval [0, $\tau_{max}$] after the initial light pulse. Consequently, the switching interval will be $[\tau_d, \tau_d+\tau_{max}]$, since the earliest possible photon emission occurs directly following the initial light pulse, the latest photon emission at the given photon confidence level occurs at time $\tau_{max}$ and in each case the detector will reactivate after time period $t_d$ after the photon emission. To ensure that the acquisition system does not switch between these states for a time equal to $\tau_{max}$ after each intermediate pulse (the time in which photon emissions are expected at the given photon confidence level), each intermediate pulse must have a distance of at least $\tau_{max}$ to the switching interval. Since the switching interval itself has a length of $\tau_{max}$, it follows that the pulse-to-pulse time interval should be at least $2\tau_{max}$, resulting in the above-defined pulse period of $2\,\tau_{max}$ or more.

In particular, for detectors exhibiting twilighting behavior, the switching interval is the same as described above, but the pulse-to-pulse time interval should be greater than $2\tau_{max}+\tau_{twilight}$ to ensure that no intermediate pulses occur during the twilighting time period at the end of $\tau_d$.

Multiple pulses as described above have the advantage that higher count rates may be achieved while minimizing artefacts due to switching of the detector state. This is due to the fact that if no photon emission is triggered by an initial light pulse, the next light pulse will follow more quickly, while the timing of the pulses is chosen such that the detector is always in a defined state with the photon confidence level.

In certain embodiments, the repetition rate is automatically adjusted to a maximum value fulfilling the property $t_p \geq 2\tau_{max}$ or $t_p=2\tau_{max}+\tau_{twilight}$, wherein $t_p$ indicates the pulse period. In other words, the highest possible value of the parameter M is automatically chosen.

In certain embodiments, in addition to adjusting the dead time in the manner described herein, the repetition rate is set or adjusted to a maximum value fulfilling the property $t_p \geq 2\tau_{max}$ or $t_p=2\tau_{max}+\tau_{twilight}$, wherein $t_p$ indicates the pulse period. In other words, the highest possible value of the parameter M is automatically chosen.

In certain embodiments, a user input comprising a selection between at least two different values of the repetition rate is received via a user interface, wherein the at least two values of the repetition rate each fulfil the conditions $t_p \geq 2\tau_{max}$ or $t_p=2\tau_{max}+\tau_{twilight}$. In particular, a message indicating that the user input comprising the selection between the at least two different values of the repetition rate may be received, is displayed by a user interface.

In certain embodiments, in case of an adjustable repetition rate, in addition to adjusting the dead time in the manner described herein, a user input comprising a selection between at least two different values of the repetition rate is received via a user interface, wherein the at least two values of the repetition rate each fulfil the conditions $t_p \geq 2\tau_{max}$ or $t_p=2\tau_{max}+\tau_{twilight}$. In particular, a message indicating that the user input comprising the selection between the at least two different values of the repetition rate may be received, is displayed by a user interface.

A second aspect of the disclosure relates to a method for detecting single photons from a sample comprising at least one emitter, particularly for microscopic imaging of the sample or localization of the at least one emitter, wherein light pulses separated by a pulse period are generated by a light source to trigger the at least one emitter to emit photons, and wherein the emitted photons are detected by an acquisition system comprising a detector, wherein the acquisition system comprises an active state, in which the acquisition system is able to detect and correctly record photons, an inactive state in which the acquisition system is unable to detect photons and optionally a twilighting state in which the acquisition system is able to detect photons but unable to correctly record the photons.

According to a first alternative of the method according to the second aspect, an input comprising a desired value of the repetition rate is received via a user interface, wherein a photon confidence level is determined based on the received input, based on a dead time of the acquisition system (wherein the acquisition system remains in the inactive state or the twilighting state for the length of the dead time after each detection of a photon), based on an expected emittance lifetime of the at least one emitter and based on a number of incident photons on the detector per light pulse.

According to a second alternative of the method according to the second aspect, an input comprising a desired value of the dead time (wherein the acquisition system remains in the inactive state or the twilighting state for the length of the dead time after each detection of a photon) is received via a user interface, wherein a photon confidence level is determined based on the received input, based on a repetition rate of the light pulses, based on an expected emittance lifetime of the at least one emitter and based on a number of incident photons on the detector per light pulse.

The photon confidence level is a measure for a probability that if one or more photon emissions are triggered by a respective light pulse, no photon emission was triggered after a maximum emittance time after the light pulse previous to the respective light pulse (that is, the light pulse immediately preceding the respective light pulse without any light pulses in between).

Further, the method according to the second aspect comprises generating an output representing the photon confidence level or indicating whether the photon confidence level is outside of a pre determined range or generating a record of the photon confidence level.

By the method according to the second aspect, the user can freely adapt the repetition rate or the dead time but can always observe the resulting photon confidence level and hence adjust the repetition rate or the dead time to a value resulting in a low probability of artefacts.

The photon confidence level is determined based on the number of incident photons per pulse. Of course, this is equivalent to determining the photon confidence level based on a photon count rate, since the number of incident photons per pulse can be described as the ratio between the photon count rate and the repetition rate (which may be set by the user input according to one alternative).

In certain embodiments, the maximum emittance time is calculated from the dead time or the desired dead time of the acquisition system and from the (fixed or adjustable) repetition rate, more particularly wherein the maximum emittance time is given by the difference between the pulse period and the dead time ($t_p-\tau_d$, wherein $t_p$ indicates the pulse period and to indicates the dead time).

As explained above in the context of the method according to the first aspect, photon emissions occur in the time interval $[0,\tau_{max}]$ after the initial light pulse at a given photon confidence level and thus, the latest return of the acquisition system into the active state happens after time $\tau_{max}+\tau_d$ from the initial light pulse.

In the method according to the second aspect, the pulse period is fixed by the user input of the repetition rate, or the dead time is fixed by the user input. Since the dead time of the acquisition system (according to the first alternative) is also fixed, or the repetition rate (according to the second alternative) is also fixed (or, even if adjustable, previously known), the time allowed for photon emission resulting in an active acquisition system at the time of the next light pulse (which is equivalent to the above-stated definition of the maximum emittance time) equals the difference between the pulse period and the dead time. By the method according to the second aspect, the photon confidence level associated with this maximum emittance time, which is a function of the repetition rate or the dead time set by the user, may be calculated.

In certain embodiments, the photon confidence level is calculated by the equation $c_p=\exp(-E\ \exp(-\tau_{max}/\tau_L))$, wherein $c_p$ indicates the photon confidence level, E indicates the number of incident photons per light pulse, $\tau_{max}$ indicates the maximum emittance time and $\tau_L$ indicates the expected emittance lifetime of the at least one emitter, particularly wherein the maximum emittance time is given by the difference between the pulse period (inverse repetition rate) and the dead time of the acquisition system. This expression can be derived as described above in equations (1) to (5) and the accompanying text.

In certain embodiments, the photon confidence level is calculated by the equation $c_p=\exp(-E(1-P^*))$, wherein $c_p$ indicates the photon confidence level, E indicates the number of incident photons per light pulse, and P* indicates the probability that each emitted photon occurs within the maximum emittance time after the respective light pulse (see equation (6) and the corresponding description above, this condition is also fulfilled for emittance decays which are not mono-exponential).

Of course, the photon confidence level may also be determined by a numerical calculation of the sum according to equation (4) or its variant using the probability P*.

In certain embodiments, the output is provided as a visual signal (e.g., a number or a symbol displayed on a graphical display) or an auditory signal (e.g., a sound or a voice output provided via a speaker or similar sound output device). The output indicating that the photon confidence level is outside of a pre-determined range may be provided in a form which is quickly recognized and understood as a warning by a user, e.g., display of a symbol in a noticeable color (such as red) and/or a blinking symbol, or a noticeable warning tone. For example, a box on a GUI having different colors according to different ranges of the photon confidence level may be displayed. For instance, a green box might indicate that the photon confidence level is within an allowed range and a red box might indicate that the photon confidence level is below a pre-defined threshold.

In certain embodiments, generating a record of the photon confidence level comprises storing data representing the photon confidence level in a memory and/or generating an entry representing the photon confidence level in a database. The record may be associated with other data, e.g., representing further parameters of the measurement. For example, the measured photon count rate may deviate over time or deviate between different areas of the sample during a measurement influencing the photon confidence level and the record may comprise values of the photon confidence level associated with corresponding values of, e.g., a time parameter of the experiment or a spatial parameter of the sample (e.g., a coordinate of a pixel or group of pixels). The record may be displayed by the user interface or a separate display device, particularly together with experimental data (e.g., images or localization maps), such that the user can associate the photon confidence level with the data.

The user interface may comprise an input device, such as a keyboard or a mouse and a display device, such as a graphical display screen or a loudspeaker. Alternatively, in particular, the user interface may comprise a single device mediating user inputs and outputs, e.g., a touch screen.

In certain embodiments of the method according to the second aspect described above, a further output indicating that a higher repetition rate or a different dead time is possible within a pre defined range of the photon confidence level is generated, particularly by means of the user interface.

In certain embodiments, the method according to the second aspect further comprises adjusting the repetition rate or the dead time to the desired value (specified in the received input). In particular, the repetition rate or the dead time is only adjusted to the desired value given that the photon confidence level is within a pre-determined range.

In certain embodiments of the method according to the first or second aspect, a count rate of the photons detected by the acquisition system is determined, wherein the number of incident photons per light pulse is continuously determined from the current count rate and repetition rate, and wherein the repetition rate or the dead time is re-adjusted (in case of the method according to the first aspect) or the photon confidence level is re-determined (in case of the method according to the second aspect) based on the determined count rate, and wherein particularly the output representing the photon confidence level or indicating whether the photon confidence level is outside of the pre-determined range and/or an output representing the current count rate is updated during or after the measurement to a value corresponding to or derived from the number of incident photons per pulse.

In certain embodiments of the method according to the first or second aspect, a measurement (particularly a microscopic imaging or localization experiment) is performed, in which the single photons from the sample are detected, wherein measurement data are generated based on the detected photons during the measurement, and wherein the measurement data are annotated based on the photon confidence level and/or the repetition rate or the dead time, particularly such that the user can see the photon confidence level or repetition rate or the dead time for certain parts of the data. In particular, such parts of the data may be pixels or pixel groups of an image or a localization map and/or sections of a temporal series. Non-limiting examples of this concept include overlaying numbers representing the photon confidence or repetition rate or dead time with certain parts of visually displayed data, or color-coding pixels of an image or a localization map according to the photon confidence or repetition rate or dead time at which the data displayed in the pixel were acquired.

In certain embodiments of the method according to the first or second aspect, a measured count rate of the single photons detected by the acquisition system is determined, wherein a systematic error introduced by the emission of at least a second photon per light pulse after detecting a first photon is corrected, yielding a corrected count rate.

In certain embodiments, the corrected count rate is determined by the equation $K=-R\cdot\ln(1-C/R)$, wherein K indicates the corrected count rate, R indicates the repetition rate of the light pulses, and C indicates the measured count rate.

The above-stated equation for K can be derived as follows assuming a Poisson distribution of the arrival times of the photons at the detector: In case R is chosen such that the detector is free to detect the first photon per pulse with high probability, the expected value of the number of photons occurring at the detector is $L=K/R$.

According to a Poisson distribution, the probability for the occurrence of n photons per pulse is $$P(n, L) = \exp(-L)L^n/n! \tag{7}$$

The detector can detect only one photon at a time with a probability given by:

$$P_d = 1 - P(n, 0) = 1 - \exp(-L) \tag{8}$$

Therefore, the measured count rate C equals $$C = P_d \cdot R = \left(1 - \exp\left(-K/R\right)\right) \cdot R. \tag{9}$$

By solving for K, one obtains $$K = -R \cdot \ln\left(1 - C/R\right). \tag{10}$$

It should be noted that the measured count rate C can reach a maximum of the repetition rate R. In this case, the corrected count rate K approaches infinity.

In certain embodiments, given that the dead time of the acquisition system is equal to or greater than the maximum emittance time, the repetition rate is adjusted such that at least one of the light pulses occurs within the dead time after the previous light pulse, and such that the pulse period equals at least twice the maximum emittance time, or, in case the acquisition system remains in a twilighting state for a twilighting time period at the end of the dead time after each detected photon, such that the pulse period equals at least twice the maximum emittance lifetime plus the twilighting time period, and wherein the repetition rate is adjusted to a value of $M/(\tau_{max}+\tau_d)$, wherein M is a natural number above 1, $\tau_{max}$ is the maximum emittance lifetime and to is the dead time of the acquisition system, the corrected count rate is determined by the equation $K=-R \cdot \ln(1-C/(R-C \cdot (M-1)))$, wherein R indicates the repetition rate of the light pulses, K indicates the corrected count rate, C indicates the measured count rate, and M is the natural number above 1.

In certain embodiments, given that the dead time of the acquisition system is equal to or greater than the maximum emittance time, the dead time is adjusted such that at least one of the light pulses occurs within the dead time after the previous light pulse, and such that the pulse period equals at least twice the maximum emittance time, or, in case the acquisition system remains in a twilighting state for a twilighting time period at the end of the dead time after each detected photon, such that the pulse period equals at least twice the maximum emittance lifetime plus the twilighting time period, and wherein the dead time is adjusted to a value of $M \cdot t_p - \tau_{max}$, wherein M is a natural number above 1, $\tau_{max}$ is the maximum emittance lifetime and $t_p$ is the pulse period of the light pulses, the corrected count rate is determined by the equation $K=-R \cdot \ln(1-C/(R-C \cdot (M-a\ 1)))$, wherein R indicates the repetition rate of the light pulses, K indicates the corrected count rate, C indicates the measured count rate, and M is the natural number above 1.

The above-stated correction can be derived as follows: It is assumed that in case a first photon is detected following the initial pulse within the interval $[0, \tau_{max}+z_d]$ the remaining $X=M-1$ pulses will occur while the detector is in the inactive state. T designates the time between two photon detections which is equal to the sum of the average time during which the detector is able to detect photons, $1/RP_d$, ($P_d$ is defined as in equation (8) above) and the time X/R (R being the repetition rate). Therefore, $$T = 1/\left(R\left(\frac{1}{P_d} + X\right)\right). \tag{11}$$

The measured count rate C is thus:

$$C = 1/T = R \cdot 1/\left(1/P_d + X\right) \tag{12}$$

Solving equation (12) for K using the definition of $P_d$ in equation (8) above and $L=K/R$ yields $$K = -R \cdot \ln\left(1 - E/(R - CX)\right) \tag{13}$$

In case C approaches $R/(1+X)$, in other words if a further photon is always detected immediately after the end of the time X/R, K approaches infinity, as expected. For X=0, in other words if no intermediate light pulses occur during the interval $[0, \tau_{max}+\tau_d]$ (M=1), equation (10) is correctly reproduced.

In certain embodiments of the method according to the first aspect or the second aspect, particularly for each photon detected by the acquisition system, an arrival time after a corresponding light pulse is determined by the acquisition system, wherein a measured emittance lifetime of the at least one emitter is obtained from the determined arrival times. As opposed to the expected emittance lifetime, the measured emittance lifetime varies, particularly depending on the local environment (e.g., presence of other molecules, temperature and pH). Such measurements may provide additional information, e.g., in double labeling experiments, for instance to distinguish between emitters with overlapping emission spectra by their different lifetimes or to obtain information on the surrounding environment in the sample (e.g., presence of quenching agents, Forster resonance energy transfer between different fluorophores). For lifetime measurements, the subject of the present disclosure advantageously improves the accuracy of the obtained lifetime data since saturation effects are mitigated by appropriately setting the repetition rate or the dead time or determining the photon confidence level.

In certain embodiments of the method according to the first aspect or the second aspect, an image of at least a partial area of the sample is generated using the measured emittance lifetime of the at least one emitter. Advantageously, adjusting the repetition rate or the dead time according to the present disclosure results in a reduction of aliasing artefacts which improves the quality of the lifetime images.

In certain embodiments, one or several measured lifetimes or lifetime distributions of the at least one emitter are determined from the arrival times of the single photons detected by the acquisition system relative to the light pulses, wherein only photon arrivals within a time window (of a length $\tau_{LT}$) after each light pulse are taken into account for the determination of the lifetime(s) or lifetime distribution(s), and the time window is shorter than the pulse period. In particular, the time window is at least 1 ns shorter than the pulse period, more particularly at least 2 ns shorter than the pulse period, even more particularly at least 5 ns shorter than the pulse period, most particularly at least 10 ns shorter than the pulse period.

In certain embodiments, the time window is determined from the dead time of the acquisition system and/or the expected or determined number of photons per pulse and/or the expected maximum lifetime, particularly wherein the length of the time window is equal to or shorter than the dead time.

In this manner, in particular, errors in determined lifetimes or lifetime distributions due to artefacts in the arrival time distributions can be further reduced, because late photons, which might occur in a time period, in which the state of the detector is undefined or the detector might switch between states, are excluded from the lifetime calculation.

In certain embodiments of the method according to the first aspect or the second aspect, the photons generated by light emittance of the at least one emitter are provided to the acquisition system via an objective of a microscope, particularly a scanning fluorescence microscope. In particular the at least one emitter is a fluorophore which emits fluorescence photons when excited by a light pulse generated by the light source. E.g., the microscope may be a STED microscope or a MINFLUX microscope.

In certain embodiments of the method according to the first aspect or the second aspect, the light pulses generated by the light source are focused on the sample comprising the at least one emitter, particularly by means of the (same) objective (used to provide the photons to the acquisition system). In particular, the detector of the acquisition system or a detector pinhole in a detector light path between the sample and the detector is arranged in a confocal plane of the objective with respect to a focal plane in the sample. If this is the case, photon counting by the acquisition system can be used to generate a confocal image of the sample. Therein, in particular, the sample is scanned to focus the light pulses on different areas of the sample, wherein for each area the photons emitted by the at least one emitter from the area are counted by the acquisition system, and a pixel characterized by a pixel value (e.g., a greyscale value or a color value) is generated for each area based on the counted number of photons. These pixels can be combined to generate a confocal image.

In certain embodiments of the method according to the first aspect or the second aspect, the acquisition system comprises a detector for detecting single photons, wherein particularly the detector is a single photon avalanche photodiode, SPAD, or a single photon avalanche photodiode, SPAD, array.

In certain embodiments of the method according to the first aspect or the second aspect, the acquisition system is or comprises a time correlated single photon counting module, TCSPC.

In certain embodiments of the method according to the first aspect or the second aspect, the single photons generated by the at least one emitter are detected by a first detector of the acquisition system and/or a second detector of the acquisition system, wherein the acquisition system comprises a first dead time when photons are detected by the first detector, and the acquisition system comprises a second dead time different from the first dead time when photons are detected by the second detector. In particular, the first detector comprises a photomultiplier or a hybrid photomultiplier and/or the second detector comprises an avalanche photodiode or an array of avalanche photodiodes. In particular, the first dead time is 10 ns or less and/or the second dead time is greater than 10 ns, particularly 25 ns to 100 ns.

In certain embodiments of the method according to the first aspect or the second aspect, the repetition rate is adjusted, particularly automatically, and/or the photon confidence level is determined dependent on whether the acquisition system operates with the first detector or the second detector.

In certain embodiments of the method according to the first aspect or the second aspect, the acquisition system is configured to switch between photon detection by the first detector and photon detection by the second detector, wherein the repetition rate is adjusted, particularly automatically, and/or the photon confidence level is determined dependent on the first dead time and the expected emittance lifetime in response to switching to photon detection by the first detector and/or wherein the repetition rate is adjusted, particularly automatically, and/or the photon confidence level is determined dependent on the second dead time and the expected emittance lifetime in response to switching to photon detection by the second detector.

In certain embodiments, the acquisition system comprises at least one avalanche photodiode, wherein quenching parameters of the avalanche photodiode are adjusted to adjust the dead time.

In particular, the quenching parameters may be a quenching time period and/or a quenching voltage of an active quenching circuit.

A third aspect of the present disclosure relates to a device for detecting single photons from a sample comprising at least one emitter, particularly wherein the device is configured to implement the method according to the first aspect and/or the second aspect. In particular, the device is a light microscope or is comprised in a light microscope, particularly a STED microscope or a MINFLUX microscope.

In certain embodiments, the device comprises a light source for generating light pulses, wherein the light pulses are adapted to trigger at least one emitter in the sample to emit a photon. The device further comprises an acquisition system for detecting single photons generated by the at least one emitter.

In certain embodiments, the device comprises a control device configured to adjust a repetition rate of the light pulses, particularly automatically, dependent on a dead time of the acquisition system, an expected emittance lifetime of the at least one emitter and optionally a number of incident photons on the detector per light pulse, particularly according to one of the embodiments of the method according to the first aspect.

In certain embodiments, the device comprises a control device configured to adjust a dead time of the acquisition system, particularly automatically, dependent on a repetition rate of the light pulses, an expected emittance lifetime of the at least one emitter and optionally a number of incident photons on the detector per light pulse, particularly according to one of the embodiments of the method according to the first aspect.

In certain embodiments, the device comprises a user interface for receiving an input.

In certain embodiments, the input indicates a (desired) photon confidence level which is a measure for the probability that if one or more photon emissions are triggered by a respective light pulse, no photon emission was triggered after the maximum emittance time after the light pulse previous to the respective light pulse.

In certain embodiments, the control device is configured to adjust the repetition rate dependent on the dead time of the acquisition system, the expected emittance lifetime, the received input indicating the (desired) photon confidence level and optionally the number of incident photons per light pulse.

In certain embodiments, the control device is configured to adjust the dead time of the acquisition system dependent on the repetition rate of the light pulses, the expected emittance lifetime, the received input indicating the (desired) photon confidence level and optionally the number of incident photons per light pulse.

In certain embodiments, the input to be received by the user interface represents a repetition rate, wherein particularly the control device is configured to adjust the repetition rate according to the input.

In certain embodiments, the input to be received by the user interface represents a (desired) dead time of the acquisition system, wherein particularly the control device is configured to adjust the dead time according to the input.

In certain embodiments, the device comprises a computation device configured to determine the photon confidence level based on the input representing the repetition rate, the dead time of the acquisition system, the expected emittance lifetime of the at least one emitter and the number of incident photons per light pulse, particularly according to the method of the second aspect.

In certain embodiments, the device comprises a computation device configured to determine the photon confidence level based on the input representing the dead time of the acquisition system, the repetition rate of the light pulses, the expected emittance lifetime of the at least one emitter and the number of incident photons per light pulse, particularly according to the method of the second aspect.

In certain embodiments, the user interface (or a separate display device comprised in the device according to the third aspect) is configured to generate an output representing the photon confidence level determined by the computation device.

In certain embodiments, the acquisition system comprises a detector for detecting single photons, particularly a single photon avalanche photodiode, SPAD, or a single photon avalanche photodiode, SPAD, array.

In certain embodiments, the acquisition system comprises an evaluation device configured to evaluate and/or process a signal provided by the at least one detector in response to a photon hitting the at least one detector.

In certain embodiments, the acquisition system is or comprises a time correlated single photon counting (TCSPC) module.

In certain embodiments, the acquisition system comprises at least a first detector for detecting single photons generated by the at least one emitter and a second detector for detecting single photons generated by the at least one emitter. In certain embodiments, the acquisition system comprises a first dead time when operating with the first detector, and the acquisition system comprises a second dead time different from the first dead time when operating with the second detector. In certain embodiments, the control device is configured to automatically adjust the repetition rate of the light pulses or the computation device is configured to determine the photon confidence level dependent on whether the acquisition system operates with the first detector or the second detector. In certain embodiments, the first detector comprises a photomultiplier or a hybrid photomultiplier and/or the second detector comprises an avalanche photodiode or an array of avalanche photodiodes.

In particular, the device comprises a switching device configured to switch between operation of the first detector and the second detector, wherein particularly the control device is configured to adjust the repetition rate, particularly automatically, or the computation device is configured to determine the photon confidence level, dependent on the first dead time, the expected emittance lifetime and optionally the number of incident photons per light pulse in response to switching to operation of the first detector and/or the control device is configured to adjust the repetition rate, particularly automatically, dependent on the second dead time, the expected emittance lifetime and optionally the number of incident photons per light pulse in response to switching to operation of the second detector.

In certain embodiments, the acquisition system, particularly the evaluation device, is configured to determine, particularly for each photon detected by the acquisition system, an arrival time after the light pulse. In particular, the device according to the third aspect, particularly the acquisition system, more particularly the evaluation device, or the computation device is configured to obtain a measured emittance lifetime of the at least one emitter from the determined arrival times.

In certain embodiments, the acquisition system, particularly the evaluation device of the acquisition system, is configured to correct the systematic error of the count rate, particularly as described for the first and second aspect. Alternatively, in certain embodiments, the device according to the third aspect comprises a computation device configured to correct the systematic error of the count rate, wherein particularly the computation device is connected to the acquisition system, more particularly to the evaluation device, or the computation device is connected to the counting device.

A fourth aspect of the specification relates to a non-transitory computer-readable medium for storing computer instructions for carrying out the method according to the first aspect and/or the second aspect, particularly when associated with a device according to the third aspect.

Wherever alternatives for single separable features are laid out herein as 'embodiments', it is to be understood that such alternatives may be combined freely to form discrete embodiments of the subject of the present disclosure.

The subject of the present disclosure is further illustrated by the following examples and figures, from which further embodiments and advantages can be drawn. These examples are meant to illustrate the subject of the disclosure but not to limit its scope.

SHORT DESCRIPTION OF THE FIGURES

FIG. 1 schematically shows a device for detecting single photons according to a first embodiment;

FIG. 2 schematically shows a device for detecting single photons according to a second embodiment;

FIG. 3 schematically shows a light microscope comprising a device according to the third aspect;

FIG. 4-7 show examples of light pulses and corresponding emitted photons to illustrate a method according to an embodiment of the present disclosure.

Figure 1:
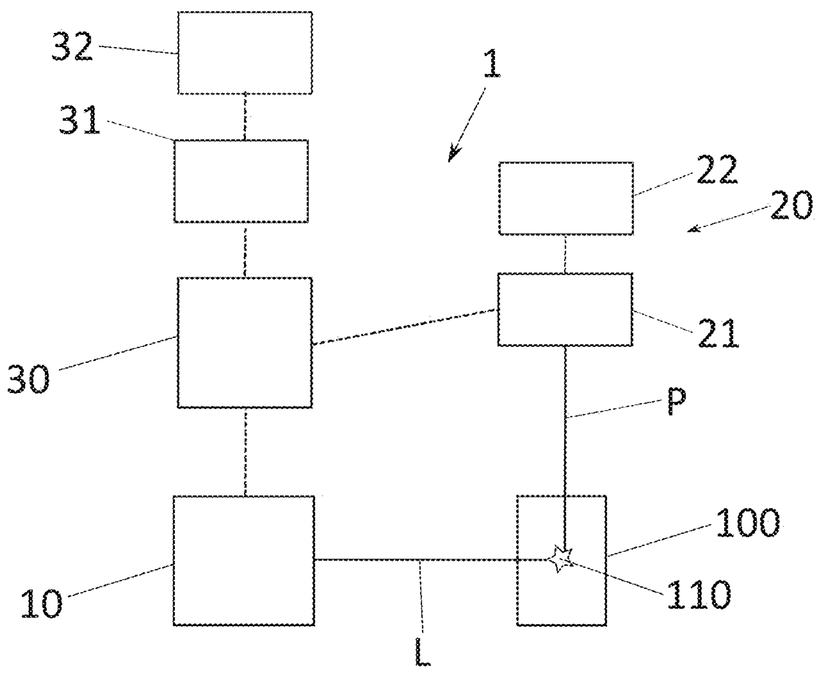
FIG. 1 schematically illustrates a device 1 for detecting single photons P. The device 1 comprises a light source 10 configured to generate light pulses L to trigger light emission from emitters 110 (e.g., fluorophores) in the sample 100.

Particularly, the light source 10 is a pulse laser, e.g., a mode-locked laser or a laser diode. Additional means for adjusting parameters of the light pulses L, such as the pulse length, may be provided in the light path between the light source 10 and the sample 100 in certain cases (not shown).

The light pulses L are emitted by the light source 10 with a repetition rate R. In particular, the light pulses L occur at constant pulse periods $t_p$ being the inverse 1/R of the repetition rate R. Typical repetition rates R of the light pulses L may be in a range of 10 MHz to 150 MHz.

The emitted photons P are detected by a detector 21 of an acquisition system 20, and a signal of the detector 21 in response to detection of a photon P is further processed by an evaluation device 22 which is electrically connected or otherwise coupled (e.g., by a data connection) to the detector 21. The detector 21 may be a single point detector or an array of individual detecting units which are able to independently detect single photons.

The detector 21 may comprise, e.g., a photomultiplier tube, an avalanche photodiode, particularly a single photon avalanche photodiode (SPAD), or a so-called hybrid detector, in which the photons are detected by a photocathode, the generated photoelectrons are accelerated by a high voltage, and directly injected into an avalanche photodiode.

In particular, the evaluation device 22 comprises electronic means for counting the detected single photons P over time and/or determining the arrival time of the photons P at the detector. Furthermore, if arrival times are obtained, the evaluation device 22 may be configured to reconstruct a waveform of the detector 21 signal from the time course of detected photons P. This process is known as time-correlated single photon counting, TCSPC. Using this procedure, e.g., the waveform of emission, which is characterized by its emittance lifetime (e.g., fluorescence lifetime), can be generated from a histogram of the arrival times of the individual detected photons.

A control device 30 is connected to the light source 10 and/or the detector 21 and configured to adjust the repetition rate R of the light pulses L and/or the dead time $\tau_d$ of the acquisition system 20, to a desired value. The device 1 further comprises a computation device 31 and a user interface 32 connected to the computation device 31 for receiving a user input and/or generating a user output. For, example, particularly in case the detector 21 is or comprises an avalanche photodiode (APD), the dead time $\tau_d$ may be adjusted by adjusting a quenching time period and/or a quenching voltage of an active or passive quenching circuit of the APD.

According to one embodiment, the computation device 31 is configured to obtain a repetition rate value or a dead time value based on a user input via the user interface 32 indicating a desired photon confidence level $c_p$, wherein the photon confidence level $c_p$ is a measure for a probability that if one or more photon emissions are triggered by a respective light pulse L, no photon emission was triggered after a maximum emittance time $\tau_{max}$ after the light pulse L previous to the respective light pulse L. In particular, this photon confidence level $c_p$ is also a measure for the probability that the acquisition system 20 is in the active state at the time of each light pulse L or for a probability that no incident photons P arrive at the detector 21 after switching of the acquisition system 20 from the inactive state to the active state or from the inactive state to the twilighting state.

The repetition rate value may be calculated based on the dead time $\tau_d$ of the acquisition system 20, the expected emittance lifetime $\tau_L$ of the at least one emitter 110 and optionally based on the number of incident photons per light pulse (which can be estimated or measured). In particular, for a mono-exponential decay of the emittance, the repetition rate value is calculated by the equation $R=1/(\tau_{max}+\tau_d)$, wherein more particularly $\tau_{max}=-\tau_L\ \ln(-\ln(c_p)/E)$, wherein R indicates the repetition rate, $\tau_{max}$ indicates the maximum emittance time, to indicates the dead time of the acquisition system 20, $\tau_L$ indicates the expected emittance lifetime of the emitter 110, $c_p$ indicates the photon confidence level (between 0 and 1) entered by the user and E indicates the measured or expected number of incident photons P per light pulse P. The computation device 31 may then prompt the control device 30 to adjust the repetition rate R to the obtained value.

According to another embodiment, the computation device 31 may be configured to obtain a dead time value based on a user input via the user interface 32 indicating a desired photon confidence level $c_p$, wherein the photon confidence level $c_p$ is a measure for a probability that if one or more photon emissions are triggered by a respective light pulse L, no photon emission was triggered after a maximum emittance time $\tau_{max}$ after the light pulse L previous to the respective light pulse L. In particular, this photon confidence level $c_p$ is also a measure for the probability that the acquisition system 20 is in the active state at the time of each light pulse L or for a probability that no incident photons P arrive at the detector 21 after switching of the acquisition system 20 from the inactive state to the active state or from the inactive state to the twilighting state. The dead time value is calculated based on the repetition rate R of the light pulses L, the expected emittance lifetime $\tau_L$ of the at least one emitter 110 and optionally based on the number of incident photons per light pulse (which can be estimated or measured). In particular, for a mono-exponential decay of the emittance, the dead time value is calculated by the equation $\tau_d=t_p-\tau_{max}$, wherein more particularly $\tau_{max}=-\tau_L\ \ln(-\ln(c_p)/E)$, wherein $t_d$ indicates the dead time of the acquisition system 20, $t_p$ indicates the pulse period, which is the inverse of the repetition rate R, $\tau_{max}$ indicates the maximum emittance time, IL indicates the expected emittance lifetime of the emitter 110, $c_p$ indicates the photon confidence level (between 0 and 1) entered by the user and E indicates the measured or expected number of incident photons P per light pulse P. The computation device 31 may then prompt the control device 30 to adjust the dead time $\tau_d$ to the obtained value.

According to another embodiment, the computation device 31 is configured to determine the photon confidence level $c_p$, particularly for given values of the dead time to and the repetition rate R.

In particular, in case of a mono-exponential decay of emittance, the photon confidence level $c_p$ is calculated by the equation $c_p=\exp(-E\exp(-\tau_{max}/\tau_L))$, wherein $\tau_{max}=1/R-\tau_d$ or $\tau_{max}=t_p-\tau_d$, wherein $c_p$ indicates the photon confidence level, E indicates the expected or measured number of incident photons per light pulse, $\tau_{max}$ indicates the maximum emittance time, $\tau_L$ indicates the expected emittance lifetime of the emitter 110, R indicates the repetition rate (particularly received via the user input), $t_p$ indicates the pulse period, which is the inverse of the repetition rate and to indicates the dead time of the acquisition system 20 (particularly received via the user input).

The determined photon confidence level $c_p$ or a graphical representation thereof may be displayed to the user by the user interface 32 or a separate display device. Furthermore, in particular, the control device 30 may adjust the repetition rate R of the light pulses L or the dead time $\tau_d$ of the acquisition system 20 according to the received input.

Figure 2:
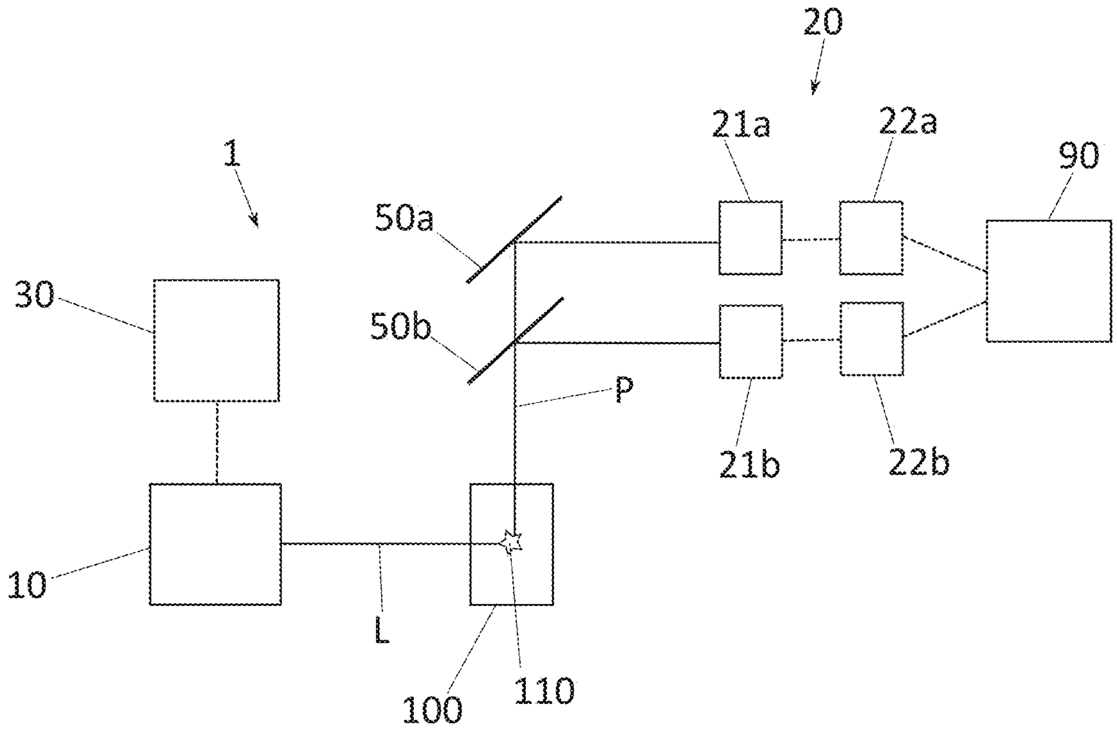

FIG. 2 shows a further embodiment of the device 1 for detecting single photons P. The device 1 is set up similar to the device 1 shown in FIG. 1, except that the acquisition system 20 comprises a first detector 21*a* and a second detector 21*b* which may be coupled to respective first and second evaluation device 22*a*, 22*b*. Alternatively, the first detector 21*a* and the second detector 21*b* may be coupled to the same evaluation device 22. The device 1 further comprises an additional switching device 90 for switching photon detection between the first detector 21*a* and the second detector 21*b*. The switching device 90 may, e.g., be coupled to the evaluation device 22.

According to an embodiment based on the device 1 shown in FIG. 2, the first detector 21*a* and the second detector 21*b* may operate according to different measurement principles. For example, the first detector 21*a* may comprise a single photon avalanche photodiode (SPAD) or an array of single photon avalanche photodiodes, and the second detector 21*b* may comprise a photomultiplier tube. The first detector 21*a* and the second detector 21*b* may be selectively used by the acquisition system 20 in a given experiment according to the specific experimental conditions. Which detector 21*a*, 21*b* is used may be determined by a user input or according to stored experimental parameters, and the acquisition system 20 may be switched from the first detector 21*a* to the second detector 21*b* and vice versa by the switching device 90. In particular, a first dead time $\tau_{d,1}$ of the acquisition system 20 when operated with the first detector 21*a* may be longer than a second dead time $\tau_{d,2}$ of the second detector 21*b* (e.g., dead times of SPADs are much longer than dead times of photomultiplier tubes). Thus, according to an embodiment of the method, the repetition rate R of the light pulses L is adjusted dependent on which detector 21*a*, 21*b* is used. In addition, if only one of the detectors 21*a*, 21*b* (e.g., the SPAD) exhibits twilighting behavior, the twilighting state may be taken into account during the automatic adjustment of the repetition rate R and/or the calculation of the photon confidence level $c_p$ only if this detector is used.

Figure 3:
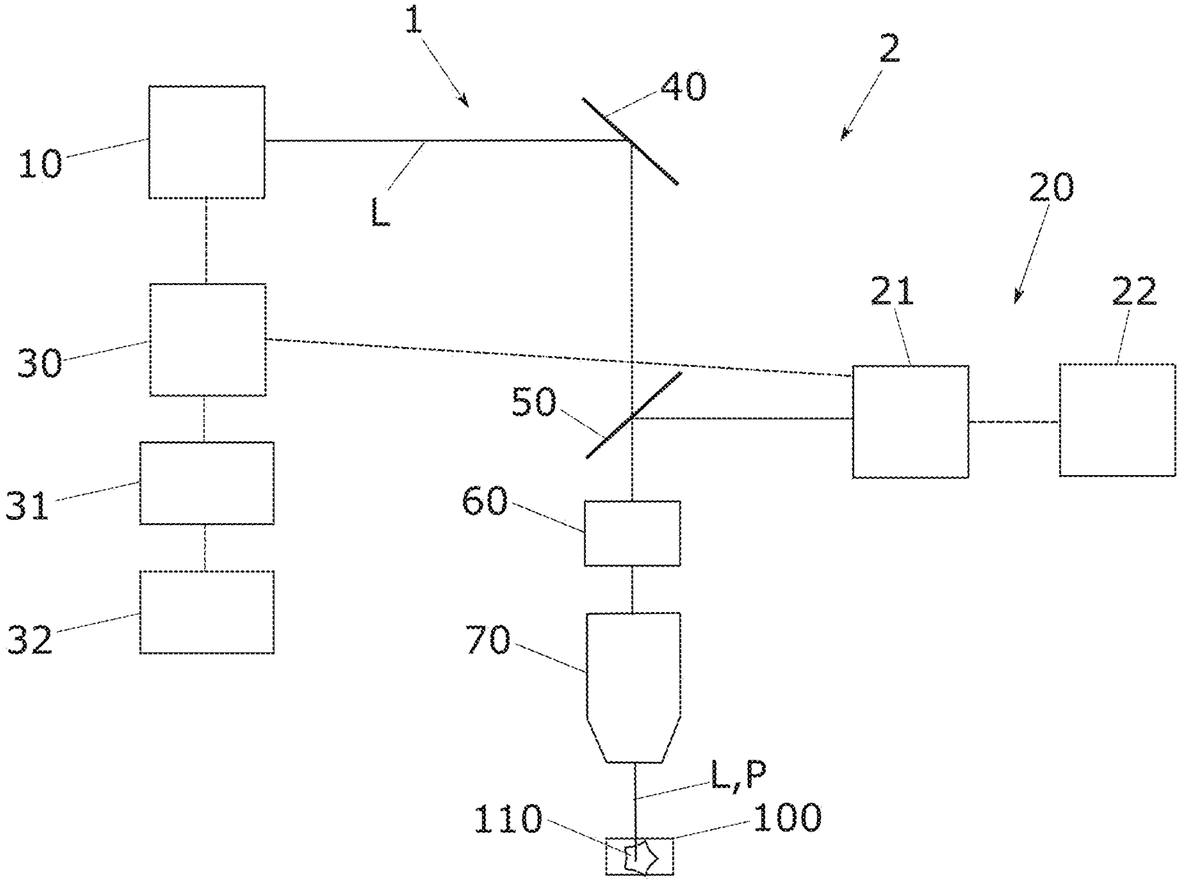

FIG. 3 shows a confocal scanning light microscope 2 comprising a device 1 for detecting single photons P as shown in FIG. 1. The light pulses L emitted by the light source 10 are relayed via a mirror 40 and a beam splitter 50 to an objective 70 which focuses the light into an area within the sample 100 containing the emitters 110. In the depicted example, the photons P emitted by the emitters 110 travel back through the objective 70 and are reflected onto the detector 21 of the acquisition system 20 by the beam splitter 50. In particular, the detector 21 may be placed in a confocal plane corresponding to the focal plane within the sample 100. A scanning device 60, such as a galvanometric scanner, is arranged in a beam path between the beam splitter 50 and the objective 70 to scan the light from the light source 10 over the sample 100 and de-scan the emitted light, such that the emitted light reaches the detector 21 of the acquisition system 20. To remove background signal from areas above and below the focal plane in a direction along the optical axis, a pinhole or equivalent means may be placed between the beam splitter 50 and the detector 21 (not shown), particularly in a confocal plane in respect of the focal plane in the sample 100. In particular, as an alternative to the incident light setup depicted in FIG. 3, a transmitted light setup, where the detector 21 is placed opposite of the objective 70 with respect to the sample 100 is conceived within the scope of the present disclosure. As in FIG. 1, a control device 30 is coupled to the light source 10 to adjust the repetition rate R of the light pulses L and/or is coupled to the acquisition system 20 to adjust the dead time $\tau_d$. The acquisition system 20 comprises the evaluation device 22 coupled to the detector 21 and configured to evaluate and/or process the output signal of the detector 21.

The acquisition system 20 of the device 1 shown in FIG. 1 and the microscope 2 shown in FIG. 3 can be operated in counting mode, i.e., the number of photons P detected by the detector 21 in a certain time interval after a preceding light pulse L are counted and a measured count rate C defined as the number of counted photons P divided by the length of the time interval is determined by the evaluation device 22. This measured count rate C is representative of a fluorescence light intensity measured at a given volume element of the sample 100 scanned by the scanning device 60 and can be converted into a pixel intensity (e.g., grey scale value or color value), to construct an image of the sample 100 from several pixels.

Furthermore, the microscope 2 shown in FIG. 3 may be used for emittance lifetime measurements and lifetime imaging (e.g., fluorescence lifetime measurements and fluorescence lifetime imaging) of the sample 100. To this end, the arrival times of the photons P hitting the detector 21 can be determined by the evaluation device 22 or the computation device 31. Subsequently, a histogram of the arrival times can be derived from the accumulated data, and a measured emittance lifetime (e.g., fluorescence lifetime) can be determined from the histogram (or directly by an algorithm without generating a histogram). The histogram resembles the waveform of emission, which in the simplest case resembles a single exponential decay. The measured emittance lifetime of the emitters 110 can then be determined from the time constant of the exponential decay. In particular, for so-called lifetime imaging, the measured emittance lifetime may then be displayed on an image of the sample 100 taken by the microscope 2, e.g., in form of a color code or as greyscale values.

According to an embodiment of the method described herein, the repetition rate R of the light pulses L is adjusted dependent on the dead time $\tau_d$ of the acquisition system 20, the expected emittance lifetime $\tau_L$ of the emitters 110 and optionally dependent on the number of incident photons per light pulse L, or the dead time $\tau_d$ of the acquisition system 20 is adjusted dependent on the repetition rate R of the light pulses, the expected emittance lifetime IL of the emitters 110 and optionally dependent on the number E of incident photons per light pulse L. To adjust the repetition rate R or the dead time $\tau_d$, the control device 30 particularly transmits a control signal to the light source 10 or to an associated device which is configured to influence the repetition rate R or to the acquisition system 20 to influence the dead time $\tau_d$. The values of the repetition rate R, the dead time $\tau_d$, the expected emittance lifetime $\tau_L$ and optionally the number E of incident photons P per light pulse L may be stored in an internal or external memory or a database, which can be accessed by the control device 30. Alternatively, the repetition rate R, the dead time $\tau_d$ and/or the expected emittance lifetime $\tau_L$ may be entered as a user input via the user interface 32.

The method is further explained hereafter with respect to the FIGS. 4 to 7.

Figure 4:
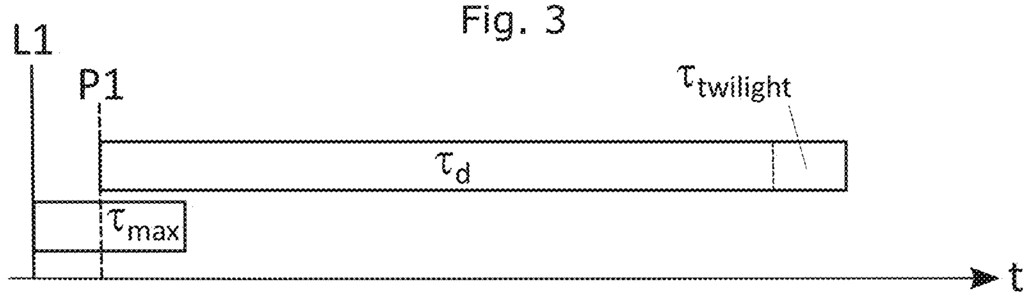

FIG. 4 schematically shows a light pulse L1 which triggers an emitter 110 to emit a first photon P1. The maximum emittance time $\tau_{max}$ of the emitter 110 following the light pulse L1 is shown. The maximum emittance time $\tau_{max}$ is a multiple (or a fraction) of the expected emittance lifetime $\tau_L$, during which photon emissions are expected with the photon confidence level $c_p$. The photon confidence level $c_p$ is a measure for a probability that if one or more photon emissions are triggered by a respective light pulse L, no photon emission was triggered after the maximum emittance time $\tau_{max}$ after the light pulse L previous to the respective light pulse. The first photon P1 is detected by the acquisition system 20. During the indicated dead time $\tau_d$ after detection of the first photon P1, the acquisition system 20 is in the inactive state, and subsequently in the twilighting state. In the inactive state the detector 21 of the acquisition system 20 is unable to detect photons P. In contrast, during the twilighting state, the detector 21 is sensitive to photons, but the evaluation device 22 is inactive, such that the acquisition system 20 cannot correctly record the detected photons P.

Figure 5:
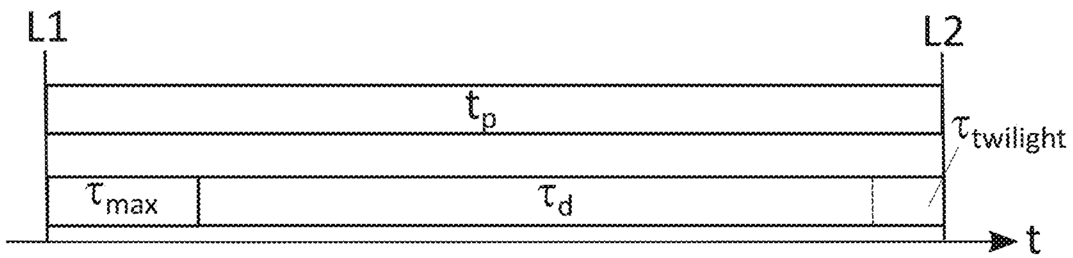

FIG. 5 shows an example in which the repetition rate R of the light pulses L or the dead time to of the acquisition system 20 has been adjusted according a first embodiment. A first light pulse L1 and a second light pulse L2 having the pulse period $t_p$ are shown. The pulse period $t_p$ has been set to a value of $t_p=\tau_{max}+\tau_d$, or the dead time $\tau_d$ has been set to a value of $\tau_d=t_p-\tau_{max}$. Thus, the acquisition system 20 is in the active state at the time of the second light pulse L2, at the given photon confidence level $c_p$.

Figure 6:
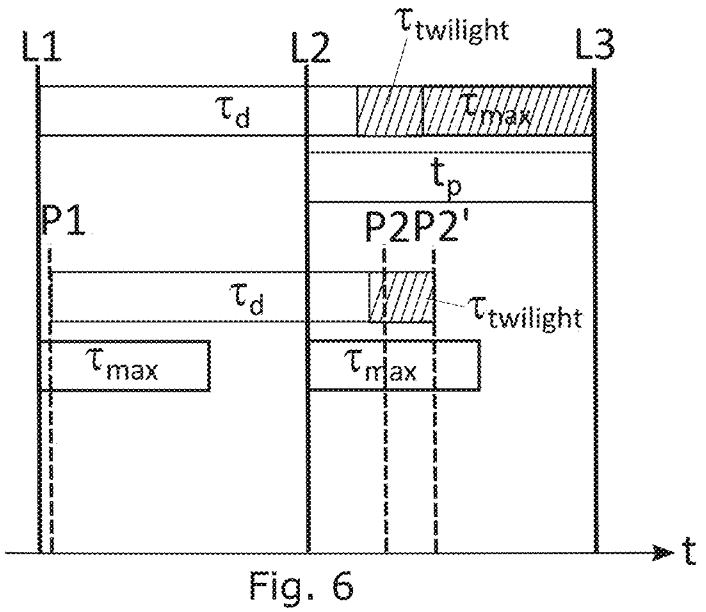
Figure 7:
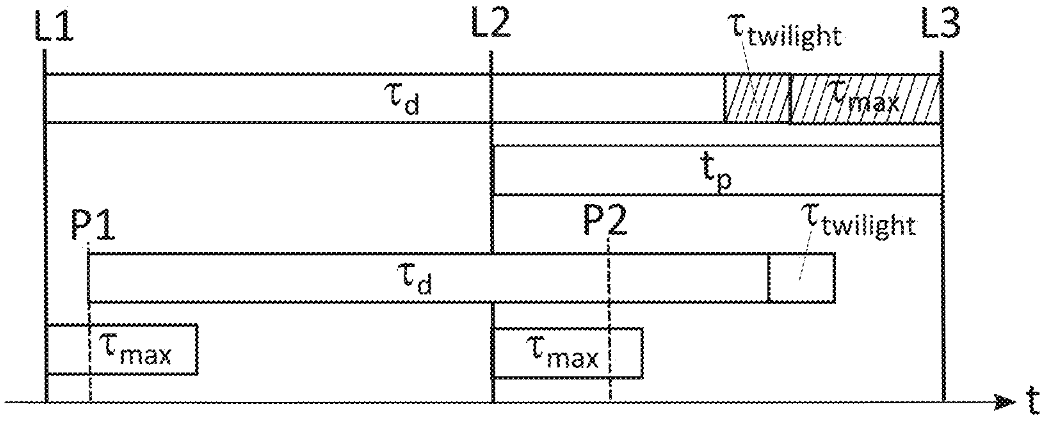

FIGS. 6 and 7 illustrate a light pulse sequence, where an intermediate second light pulse L2 is provided in the time interval between the first light pulse L1 and a third light pulse L3, and thus, $2t_p=\tau_{max}+\tau_d$.

FIG. 6 shows a situation, in which the intermediate light pulse L2 would lead to artefacts in the photon arrival time histogram due to an undefined state of the acquisition system 20, whereas FIG. 7 shows an embodiment of the method, in which the intermediate light pulse L2 does not result in artefacts, at least at the given photon confidence level $c_p$.

Switching of the acquisition system 20 back to the active state will occur after the dead time $\tau_d$ following detection of the photon P1. The actual time of switching depends on the stochastic arrival time of the photon P1, which is distributed in the interval $[0, \tau_{max}]$ with the photon confidence level $c_p$. Thus, the possible switching time points are distributed in the interval $[\tau_d, \tau_d+\tau_{max}]$. If the second (intermediate) light pulse L2 occurs in this interval or shortly before, the acquisition system 20 may become active around the time of a second photon P2 triggered by the second pulse L2. To avoid this with the pre-selected photon confidence level $c_p$, the second light pulse L2 must have at least a distance of $\tau_{max}$ from the interval $[\tau_d, \tau_d+\tau_{max}]$, in which switching to the active state may occur. Therefore, in this case, the pulse period $t_p$ should be set to at least $2\tau_{max}$ (the distance of L2 from the interval $[\tau_d, \tau_d+\tau_{max}]$ plus the length of this interval).

If the acquisition system 20 comprises a twilighting state, the twilighting time period $\tau_{twilight}$ has to be taken into account as well. In the situation depicted at the bottom of FIG. 6, the second photon P2 triggered by the second light pulse L2 occurs within the twilighting time period $\tau_{twilight}$. Thus, the photon P2 is detected by the detector 21, but the evaluation device 22 does not re activate until the end of the dead time $\tau_d$. The arrival time of the photon P2 is therefore erroneously recorded at P2'. The 'switching interval' for switching of the acquisition system 20 from the inactive state to the active state or the twilighting state is cross hatched in FIGS. 6 and 7.

To avoid artefacts in the photon arrival time histogram, the second photon P2 must not occur in the twilighting time period $\tau_{twilight}$. In the situation shown in FIG. 7, this is accomplished by a pulse period $t_p$ which is greater than $2\tau_{max}+\tau_{twilight}$. The arrival time of the second photon P2 is distributed in an interval of the length $\tau_{max}$ after the light pulse L2 with the given photon confidence level $c_p$. Thus, a distance of at least $2\tau_{max}+\tau_{twilight}$ excludes at the photon confidence level $c_p$ that the second photon P2 occurs in the twilighting time period $\tau_{twilight}$, where switching from the inactive state to the twilighting state may take place, and that the second photon P2 is not detected after the dead time $\tau_d$ following the first photon P1, wherein the acquisition system 20 may switch back to the active state.

Due to the adjustment of the repetition rate R or the dead time $\tau_d$ according to the above-discussed embodiment, at the time of the second light pulse L2 the acquisition system 20 is either active (in case no photon was detected following the first light pulse L1), or inactive (if a photon emission was triggered by the first light pulse L1) at the pre-selected photon confidence level $c_p$. Therefore, the repetition rate R can be increased in certain cases to optimize the incident photon rate while reducing artefacts due to undefined detector states. In addition, the pile-up effect can be corrected more easily in the resulting data.

LIST OF REFERENCE SIGNS

1 Device for detecting single photons
10 Light source
20 Acquisition system
21 Detector
21*a* First detector
21*b* Second detector
22 Evaluation device
30 Control device
31 Computation device
32 User interface
40 Mirror
50 Beam splitter
60 Scanning device
70 Objective
90 Switching device
100 Sample
110 Emitter
L,L1,L2,L3 Light pulse
P,P1,P2 Photon
$\tau_d$ Dead time
$\tau_L$ Expected emittance lifetime
$\tau_{LT}$ Time window
$\tau_{max}$ Maximum emittance time
$t_p$ Pulse-to-pulse time interval (pulse period)

The invention claimed is:

1. A method for detecting single photons from a sample comprising at least one emitter, wherein light pulses separated by a pulse period are generated by a light source to trigger the at least one emitter to emit photons, and wherein the emitted photons are detected by an acquisition system comprising a detector, wherein the acquisition system comprises an active state, in which the acquisition system is able to detect and correctly record photons, an inactive state in which the acquisition system is unable to detect photons and optionally a twilighting state in which the acquisition system is able to detect photons but unable to correctly record the photons, wherein the acquisition system remains in the inactive state or the twilighting state for a dead time after each detection of a photon, wherein a repetition rate of the light pulses is adjusted dependent on the dead time of the acquisition system, and an expected emittance lifetime of the at least one emitter, wherein a measured count rate of the single photons detected by the acquisition system is determined, wherein a systematic error introduced by the emission of at least a second photon per light pulse after detecting a first photon is corrected, yielding a corrected count rate.

2. The method according to claim 1, wherein the adjustment of the repetition rate of the light pulses is further dependent on a number of incident photons on the detector per light pulse.

3. The method according to claim 1, wherein the repetition rate is adjusted such that for each light pulse triggering a photon emission, the acquisition system is in the active state with a certain confidence level when emitted photons arrive at the detector, and/or arrival of incident photons on the detector after switching of the acquisition system from the inactive state to the active state or from the inactive state to the twilighting state but before the next light pulse can be excluded with a certain confidence level.

4. The method according to claim 1, wherein the pulse period is adjusted according to a monotonically increasing function of the dead time of the acquisition system and the expected emittance lifetime of the at least one emitter.

5. The method according to claim 4, wherein the pulse period is set to a value of $t_p=\tau_d+a\cdot\tau_L$, wherein to indicates the dead time of the acquisition system, a is a scaling parameter which is a positive real number equal to or greater than 1 and $t_L$ indicates the expected emittance lifetime of the at least one emitter.

6. The method according to claim 1, wherein a photon confidence level is provided, wherein the photon confidence level is a measure for a probability that if one or more photon emissions are triggered by a respective light pulse, no photon emission was triggered after a maximum emittance time after the light pulse previous to the respective light pulse, wherein the repetition rate is adjusted based on the photon confidence level and/or the maximum emittance time.

7. The method according to claim 6, wherein the maximum emittance time is determined by the equation $\tau_{max}=-\tau_L$ In $(-\ln(c_p)/E)$, wherein $\tau_L$ indicates the expected emittance lifetime, ln indicates the natural logarithm, $c_p$ indicates said photon confidence level and E indicates the expected number of photons per pulse.

8. The method according to claim 6, wherein the pulse period ($t_p$) is adjusted to $\tau_{max}+\tau_d$ or more, wherein $\tau_{max}$ indicates the maximum emittance time of the at least one emitter and ta indicates the dead time of the acquisition system.

9. The method according to claim 6, wherein the repetition rate is adjusted to different values during a measurement such that the photon confidence level is in a pre-defined range during the measurement.

10. The method according to claim 6, wherein given that the dead time of the acquisition system is equal to or greater than the maximum emittance time, the repetition rate is adjusted such that at least one of the light pulses occurs within the dead time after the previous light pulse, and such that the pulse period equals at least twice the maximum emittance time, or, in case the acquisition system remains in a twilighting state for a twilighting time period at the end of the dead time after each detected photon, the repetition rate is adjusted such that the pulse period equals at least twice the maximum emittance time plus the twilighting time period.

11. The method according to claim 6, wherein a count rate of the photons detected by the acquisition system is determined, wherein the number of incident photons per light pulse is continuously determined from the current count rate and repetition rate, and wherein the repetition rate is readjusted or the photon confidence level is re-determined based on the determined count rate.

12. The method according to claim 6, wherein a measurement is performed, in which the single photons from the sample are detected, wherein measurement data are generated based on the detected photons during the measurement, and wherein the measurement data are annotated based on the photon confidence level and/or the repetition rate.

13. The method according to claim 1, wherein the corrected count rate is determined by the equation $K=-R\cdot\ln(1-C/R)$, wherein K indicates the corrected count rate, R indicates the repetition rate of the light pulses, and C indicates the measured count rate.

14. The method according to claim 1, wherein the corrected count rate is determined by the equation $K=-R\cdot\ln(1-C/(R-C\cdot(M-1)))$, wherein R indicates the repetition rate of the light pulses, K indicates the corrected count rate, C indicates the measured count rate, and M is said natural number above 1.

15. The method according to claim 1, wherein one or several measured lifetimes or lifetime distributions of the at least one emitter are determined from the arrival times of the single photons detected by the acquisition system relative to the light pulses, wherein only photon arrivals within a time window after each light pulse are taken into account for said determination and the time window is shorter than the pulse period.

16. A device for detecting single photons from a sample comprising at least one emitter, wherein the device is configured to implement the method according to claim 1.

* * * * *